(12) United States Patent
Johnson et al.

(10) Patent No.: US 7,602,163 B2
(45) Date of Patent: Oct. 13, 2009

(54) COUPLED INDUCTOR OUTPUT REGULATION

(75) Inventors: Brian Patrick Johnson, Cedar Park, TX (US); Daniel E. Jenkins, Bastrop, TX (US)

(73) Assignee: Dell Products L.P., Round Rock, TX (US)

( * ) Notice: Subject to any disclaimer, the term of this patent is extended or adjusted under 35 U.S.C. 154(b) by 389 days.

(21) Appl. No.: 11/313,343

(22) Filed: Dec. 20, 2005

(65) Prior Publication Data

US 2007/0139020 A1 Jun. 21, 2007

(51) Int. Cl.
*G05F 1/40* (2006.01)
(52) U.S. Cl. ...................................... 323/282
(58) Field of Classification Search ............ 323/207, 323/223, 247, 259, 355, 21.12, 22, 23, 56.02, 323/56.05, 56.06, 282; 363/59, 21.12, 22, 363/23, 56.02, 56.05, 56.06
See application file for complete search history.

(56) References Cited

U.S. PATENT DOCUMENTS

| | | | |
|---|---|---|---|
| 5,307,005 A | 4/1994 | Ahladas et al. | |
| 5,736,842 A | 4/1998 | Jovanovic | |
| 5,923,153 A | 7/1999 | Liu | |
| 6,396,333 B2 | 5/2002 | Dubhashi et al. | |
| 6,495,993 B2 | 12/2002 | Eagar | |
| 6,496,396 B2 | 12/2002 | Davila et al. | |
| 6,737,842 B2 | 5/2004 | Bai et al. | |
| 6,903,914 B1 * | 6/2005 | Moussaoui | 361/111 |
| 2001/0035745 A1 * | 11/2001 | Muratov et al. | 323/283 |
| 2003/0111982 A1 * | 6/2003 | Watanabe | 323/225 |
| 2007/0029981 A1 | 2/2007 | Johnson et al. | |

OTHER PUBLICATIONS

Robert Balog, Philip T. Krein, David C. Hamill, Coupled Inductors-A Basic Filter Building Block, pp. 1-7.
Milan M. Jovanovic, A Technique For Reducing Rectifier Reverse-Recovery-Related Losses In High-Power Boost Converters, IEEE Transactions on Power Electronics, Sep. 1998, vol. 13, No. 5, p. 932-p. 941, IEEE.
N. Aiello, F. Gennaro, AN1514 Application Note VIPower: Double Output Buck Or Buck-Boost Converter Using VIPER12/22A, Feb. 2002, pp. 1-11, STMicroelectronics, Italy, http://www.st.com.
Jieli Li, Charles R. Sullivan, Aaron Schultz, Coupled-Inductor Design Optimization For Fast-Response Low-Voltage DC-Dc Converters, 2002, pp. 1-5, APEC.
Qun Zhao, Performance Improvement of Power Conversion By Utilizing Coupled Inductors, Dissertation Submitted to the Faculty of the Virginia Polytechnic Institute and State University in partial fulfillment of the requirements for the degree of Doctor of Philosophy in Electrical Engineering, Feb. 3, 2003, Blacksburg, Virginia.

(Continued)

*Primary Examiner*—Adolf Berhane
*Assistant Examiner*—Nguyen Tran
(74) *Attorney, Agent, or Firm*—Haynes and Boone, LLP (57) ABSTRACT

An information handling system includes a power converter having a first switched inductor to supply current to a load. A second switched inductor is inductively coupled to the first switched inductor. A control circuit activates the second switched inductor in response to a change in the power requirements of the load, so as to remove energy stored in the first switched inductor and thereby regulate the output voltage of the power converter when load current is stepped downwards.

11 Claims, 9 Drawing Sheets

OTHER PUBLICATIONS

T.H. Kim, J.H. Park, B.H. Cho, Small-Signal Modeling of the Tapped-Inductor Convertor Under Variable Frequency Control, 2004 35th Annual IEEE Power Electronics Specialists Conference, 2004, p. 1648-p. 1652, IEEE, Aachen, Germany.

* cited by examiner

COUPLED INDUCTOR OUTPUT REGULATION

BACKGROUND

The description herein relates to information handling systems having power converters, and more particularly to such systems that present variable load conditions to such power converters.

As the value and use of information continue to increase, individuals and businesses seek additional ways to process and store information. One option available to users is information handling systems. An information handling system ("IHS") generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Most information handling systems include one or more power converters to convert power at a supply voltage (AC or DC) to power at a voltage expected by a particular electronic system component or by a group of such components.

SUMMARY

A power converter for an information handling system includes a first switched inductor to supply current to a load. A second switched inductor is inductively coupled to the first switched inductor. A control circuit activates the second switched inductor in response to a change in the power requirements of the load, so as to remove energy stored in the first switched inductor.

DETAILED DESCRIPTION

For purposes of this disclosure, an information handling system ("IHS") includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
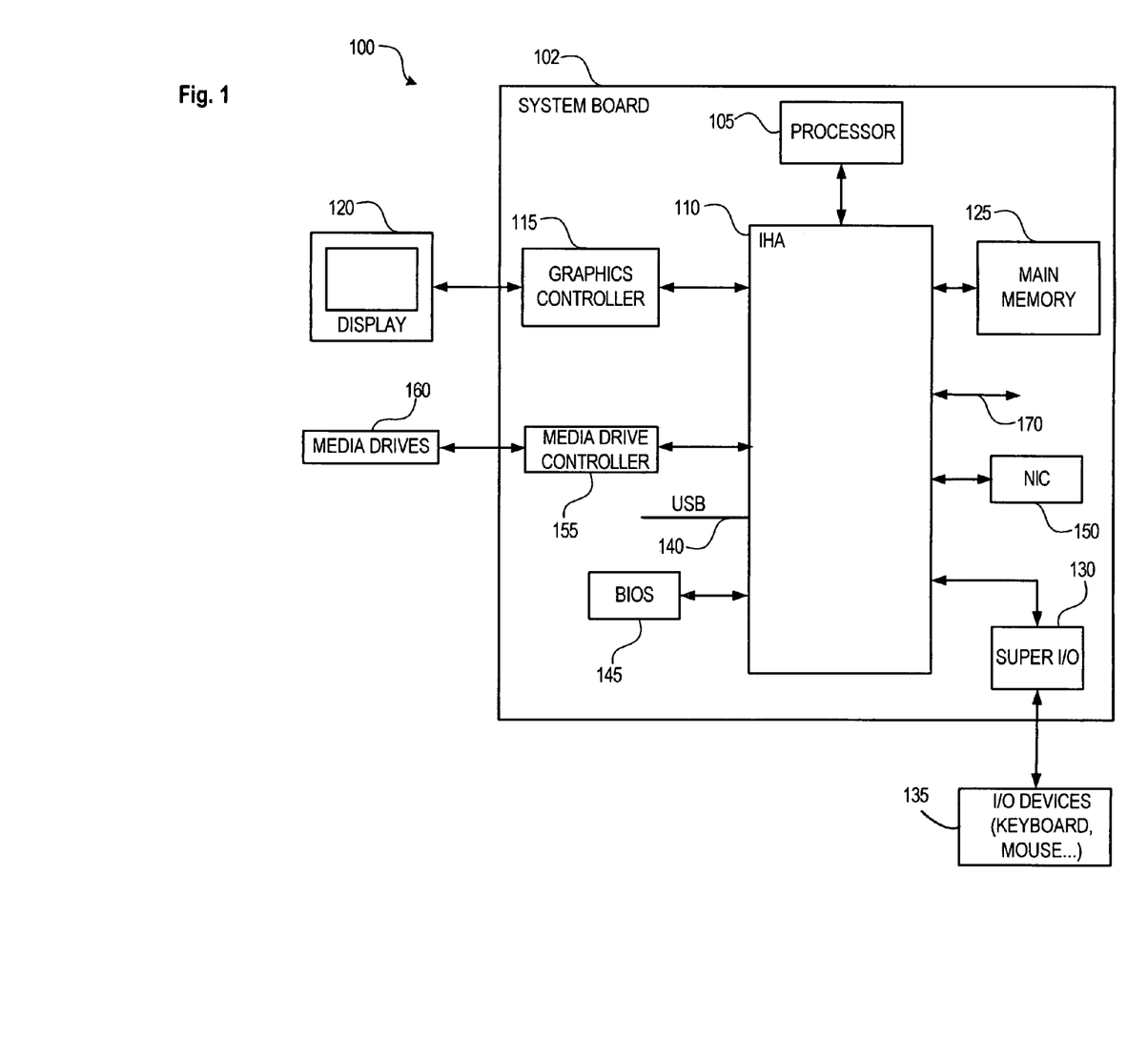
FIG. 1 is a block diagram illustrating an embodiment of an information handling system.

FIG. 1 is a block diagram of an information handling system ("IHS"), according to an illustrative embodiment. The IHS 100 includes a system board 102. The system board 102 includes a processor 105 such as an Intel Pentium series processor or one of many other processors currently available. An Intel Hub Architecture (IHA) chipset 110 provides the IHS system 100 with graphics/memory controller hub functions and I/O functions. More specifically, the IHA chipset 110 acts as a host controller that communicates with a graphics controller 115 coupled thereto. A display 120 is coupled to the graphics controller 115. The chipset 110 further acts as a controller for a main memory 125, which is coupled thereto. The chipset 110 also acts as an I/O controller hub (ICH) which performs I/O functions. A super input/output (I/O) controller 130 is coupled to the chipset 110 to provide communications between the chipset 110 and input devices 135 such as a mouse, keyboard, and tablet, for example. A universal serial bus (USB) 140 is coupled to the chipset 110 to facilitate the connection of peripheral devices to system 100. A basic input-output system (BIOS) 145 is coupled to the chipset 110 as shown. The BIOS 145 is stored in CMOS or FLASH memory so that it is nonvolatile.

A local area network (LAN) controller 150, alternatively called a network interface controller (NIC), is coupled to the chipset 110 to facilitate connection of the system 100 to other IHSs. Media drive controller 155 is coupled to the chipset 110 so that devices such as media drives 160 can be connected to the chipset 110 and the processor 105. Devices that can be coupled to the media drive controller 155 include CD-ROM drives, DVD drives, hard disk drives, and other fixed or removable media drives. An expansion bus 170, such as a peripheral component interconnect (PCI) bus, PCI express bus, serial advanced technology attachment (SATA) bus or other bus is coupled to the chipset 110 as shown. The expansion bus 170 includes one or more expansion slots (not shown) for receiving expansion cards which provide the IHS 100 with additional functionality.

Not all information handling systems include each of the components shown in FIG. 1, and other components not shown may exist. As can be appreciated, however, many systems are expandable, and include or can include some components that operate intermittently, and/or single components that can operate at multiple power levels. Thus, an IHS generally has variable power needs. Individual components and/or subsystems of an IHS generally derive power from a power converter. The power converter accepts AC and/or DC input power at a first voltage, and supplies DC output power at a second voltage required by its load.

Power converters range in size. Large converters may supply standard voltages to bus-mounted components, drives, circuit boards, etc. Small power converters may power a single device package and be integral to that package or placed in close proximity to that package. In most cases, it is desirable for the converter to have small size, efficient operation, and good voltage regulation.

Figure 2:
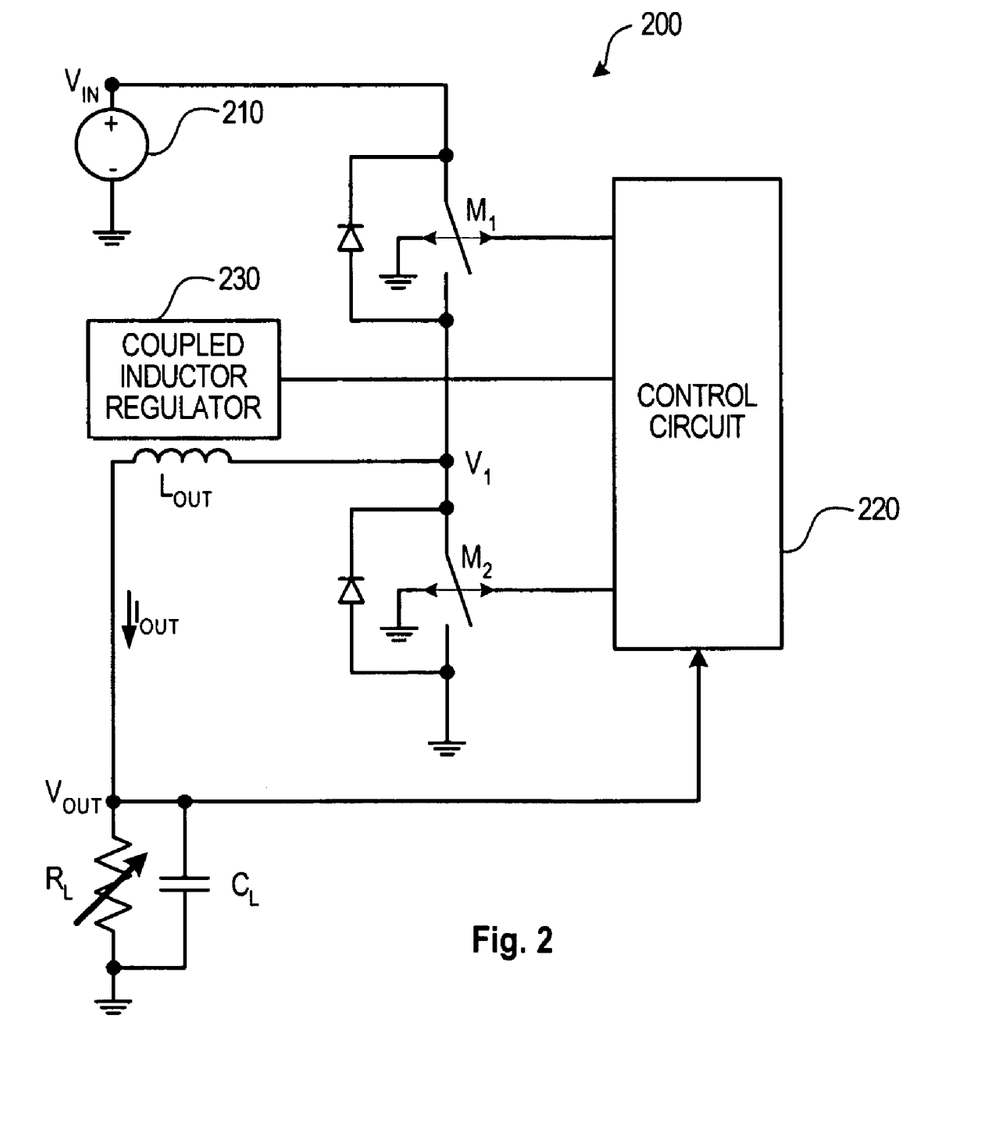
FIG. 2 is a circuit diagram of a power converter according to an illustrative embodiment, for use in the information handling system of FIG. 1.

FIG. 2 illustrates a power converter 200 coupled between a power supply 210 and a load comprising a variable resistive load $R_L$ and a parallel capacitance $C_L$. The power supply supplies power at a nominal voltage $V_{IN}$. The load requires power supplied at a component supply voltage $V_{OUT}$.

The power converter comprises an output inductor $L_{OUT}$, two switches (shown as MOSFET switches) $M_1$ and $M_2$, a control circuit 220, and a coupled inductor regulator 230. Inductor $L_{OUT}$ and switches $M_1$, $M_2$ are arranged in a buck converter configuration. Inductor $L_{OUT}$ is coupled between the power converter output and a node $V_1$. The drain/source current path of switch $M_1$ is coupled between power supply 210 and node $V_1$. The drain/source current path of switch $M_2$ is coupled between node $V_1$ and ground. The control circuit senses the voltage $V_{OUT}$, and supplies alternating signals to the gates of $M_1$ and $M_2$. By adjusting a duty cycle (the ratio of the time $M_1$ is on to the time period between successive $M_1$ activations), control circuit 220 varies the average current $I_{OUT}$ passing through $L_{OUT}$, and thereby controls $V_{OUT}$.

Because $L_{OUT}$ stores energy in its field, it cannot instantaneously change $I_{OUT}$ in response to variations in the current requirements of load $R_L$. Thus, capacitance $C_L$ supplies or sinks initial changes in load current requirements, until $L_{OUT}$ can adjust its field to the new value of $I_{OUT}$. Unfortunately, as $C_L$ supplies or sinks current it changes the value of $V_{OUT}$. Unless capacitance $C_L$ is sufficiently large (which may be undesirable from a cost or size standpoint), such voltage variations can fall outside the tolerances of the load. Particularly when $C_L$ is sinking excess load current due to a reduction in the load current, voltage $V_{OUT}$ may rise to a level that is harmful to the load.

Power converter 200 does not rely solely on $C_L$ when $R_L$ reduces load requirements such that $V_{OUT}$ begins to rise unacceptably. Instead, when control circuit 220 senses $V_{OUT}$ rising unacceptably, it activates coupled inductor regulator 230. Regulator 230, when activated, provides a second path for the energy stored in $L_{OUT}$, allowing $I_{OUT}$ to be reduced almost instantaneously. This approach can assist, in appropriate designs, voltage regulation when the load steps from a higher power requirement to a lower power requirement, by dissipating or shifting energy stored in $L_{OUT}$ out of the power converter.

Figure 3:
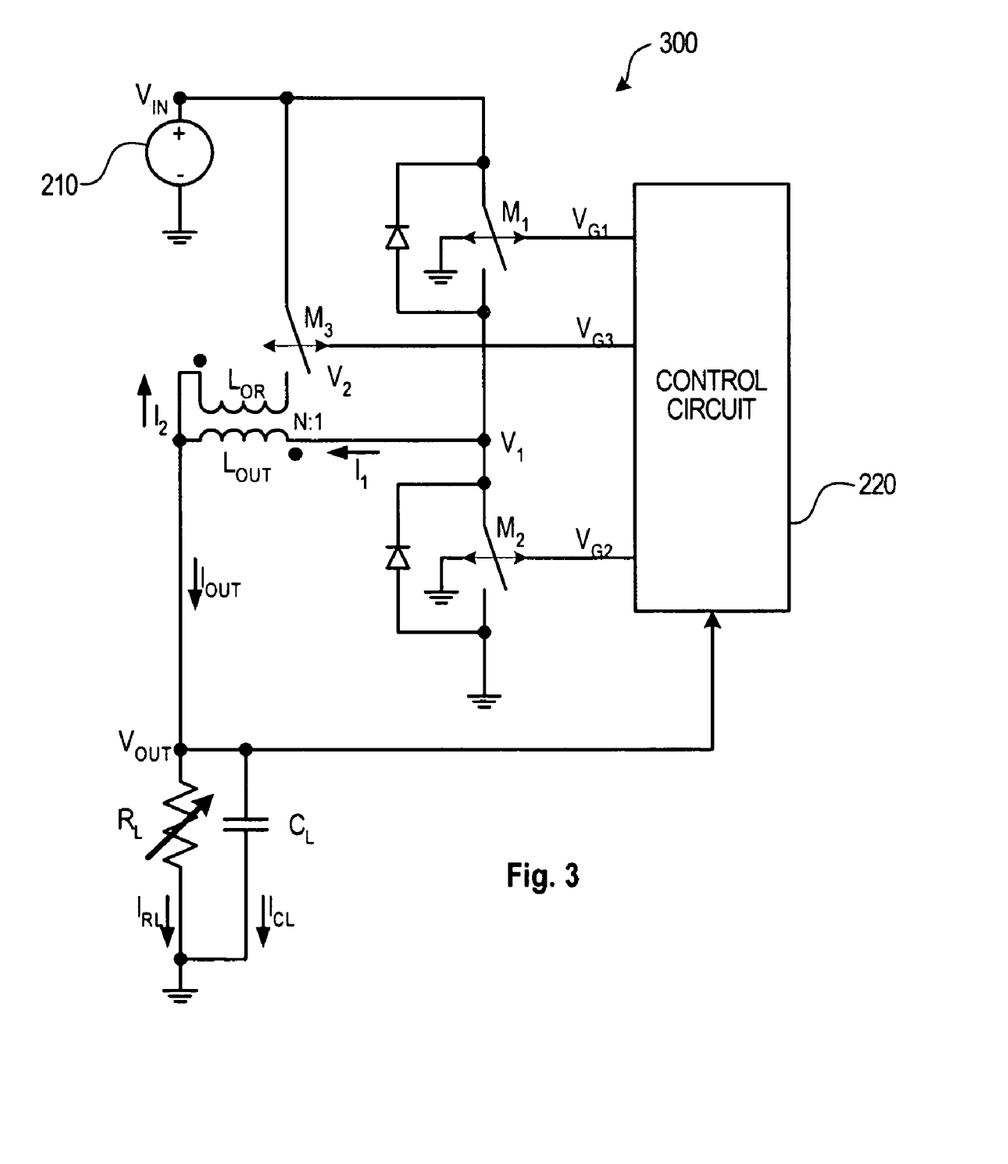
FIG. 3 is a block diagram of a power converter according to an embodiment that returns energy back to a power supply.

FIG. 3 shows a power converter embodiment 300, where a coupled inductor regulator comprises a MOSFET switch $M_3$ and an output regulation inductor $L_{OR}$. One terminal of $L_{OR}$ is coupled to the output of $L_{OUT}$. The drain/source path of $M_3$ is coupled between the other terminal of $L_{OR}$ and the power supply input $V_{IN}$. The gate of $M_3$ is controlled by a gate signal $V_{G3}$ supplied by control circuit 220.

$L_{OR}$ is inductively coupled to $L_{OUT}$, e.g., by winding the inductors on a common core. The winding is configured such that current $I_1$ through $L_{OUT}$ can induce a current $I_2$ through $L_{OR}$ that draws current away from the power converter output and returns the current to power supply 210. This not only provides voltage regulation when the load steps to a lower power requirement, but allows the energy stored in $L_{OUT}$ to be recovered back to the power supply.

The turns ratio N:1 (N turns on $L_{OR}$ for each turn on $L_{OUT}$) is related to the nominal power supply voltage and the nominal output voltage. For instance, assume that $M_2$ and $M_3$ are simultaneously activated, and ignore the voltage drops across $M_2$ and $M_3$ when those devices are conducting current. The voltage drop across $L_{OUT}$ when $M_2$ is active is thus approximately $V_{OUT}$. The voltage drop across $L_{OR}$ when $M_3$ is active is approximately $V_{IN}$-$V_{OUT}$. Thus, the design turns ratio is approximately $(V_{IN}-V_{OUT})/V_{OUT}$. This provides a current ratio I1/I2 equal to the turns ratio, and allows $L_{OR}$ to be effectively switched in/out during output regulation.

Figure 4:
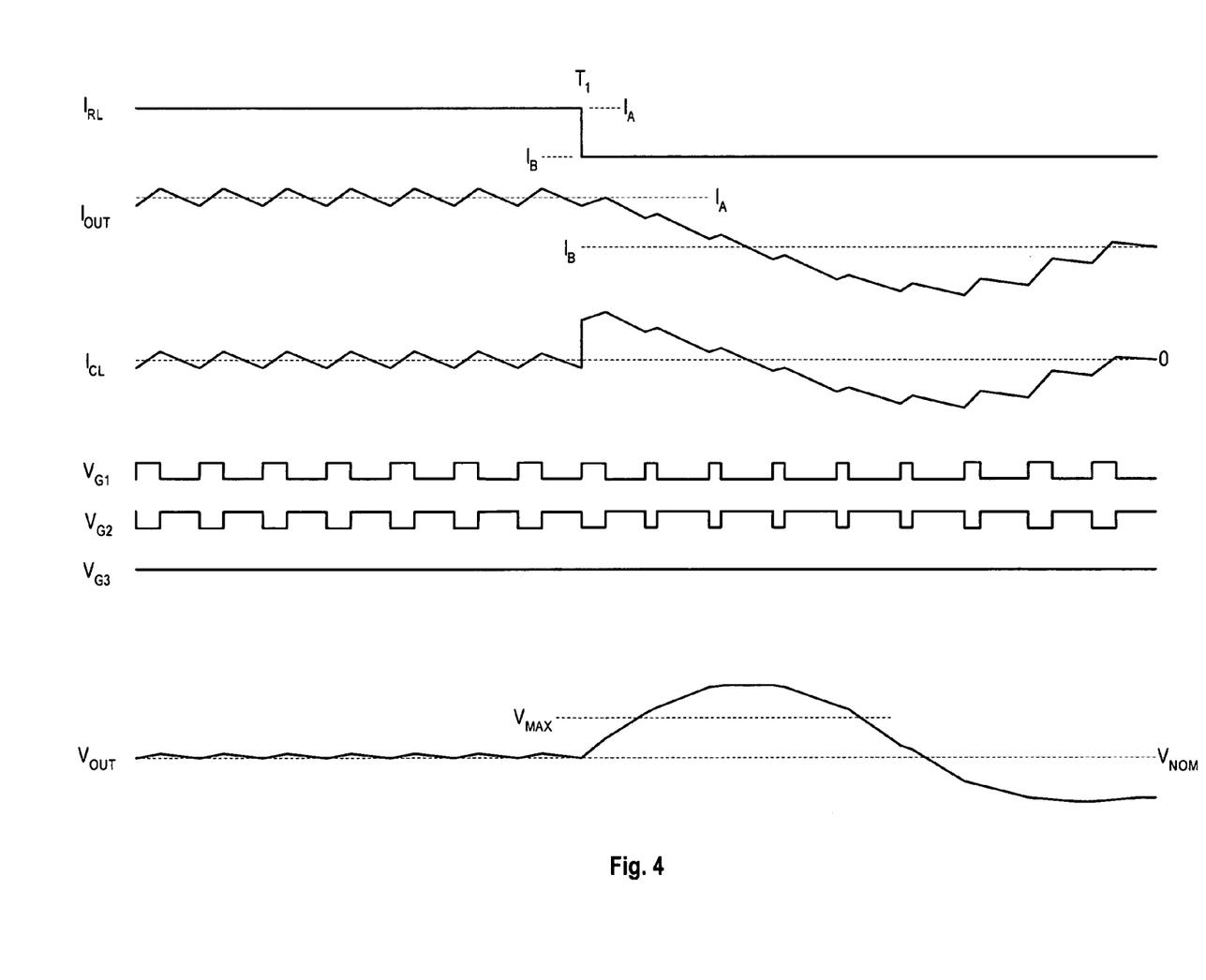
FIGS. 4 and 5 illustrate waveforms for the operation of the power converter of FIG. 3, with and without operation of the coupled inductor regulator.
Figure 5:
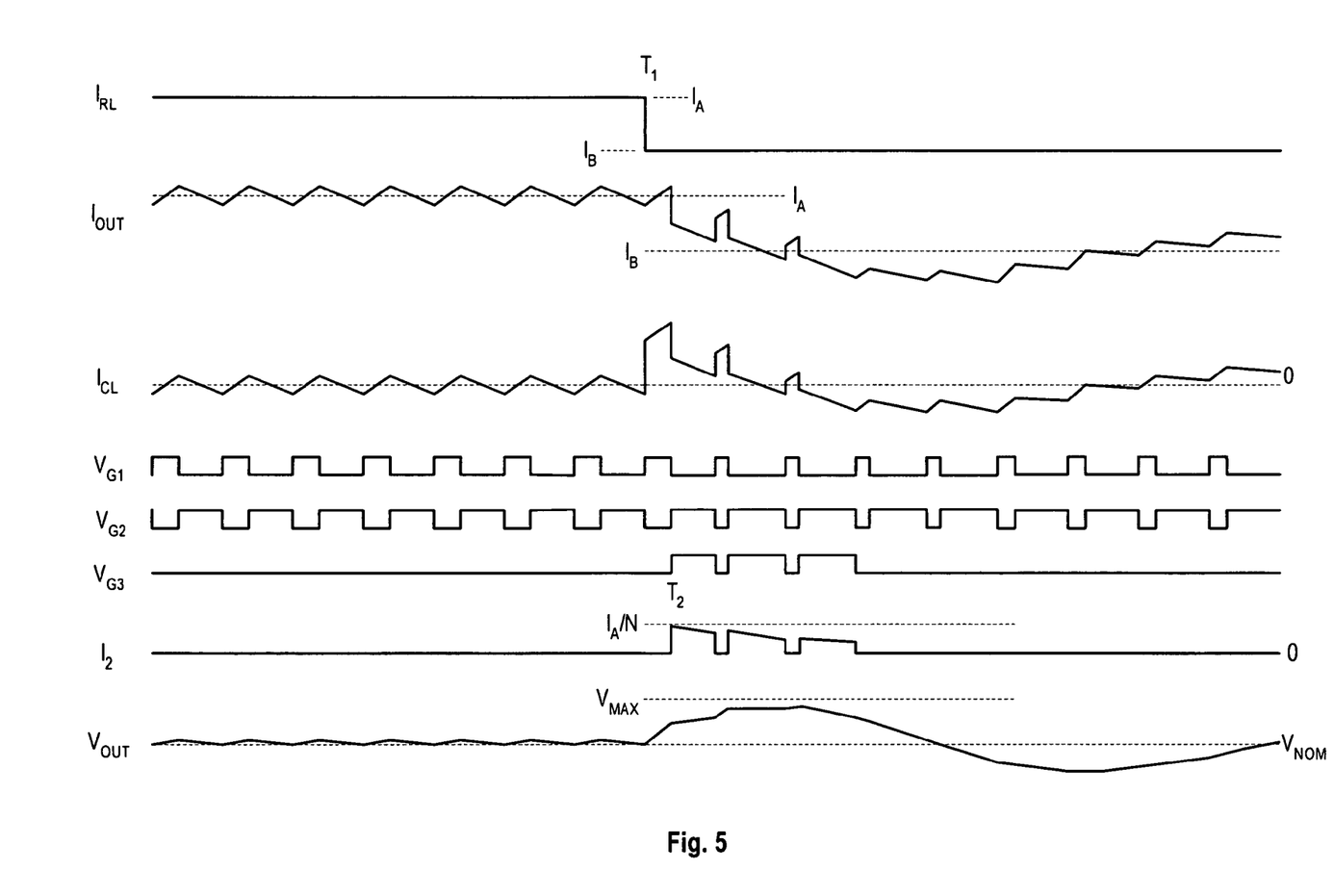

FIGS. 4 and 5 compare operation of power converter 300 under conditions of a stepped reduced load power, with and without activation of the output regulation inductor. First, in FIG. 4 gate signals $V_{G1}$ and $V_{G2}$ are supplied at one steady-state duty cycle to switches $M_1$ and $M_2$ in order to maintain current $I_{OUT}$ at an average current value $I_A$ required by $R_L$. The actual load current $I_{RL}$ is constant at $I_A$, even though $I_{OUT}$ varies slightly above and below this value as $M_1$ and $M_2$ are alternately switched. The small variations in $I_{OUT}$ are compensated by corresponding variations in charging current $I_{CL}$ supplied to capacitance $C_L$.

At time $T_1$, load $R_L$ reduces its current requirements from $I_A$ to a lower current $I_B$. The excess power converter output current is thus diverted to $C_L$, and the power converter output voltage $V_{OUT}$ begins to rise. Control circuit 220 senses the rise in $V_{OUT}$ and begins reducing its duty cycle to compensate (the illustrated duty cycle response is not intended to be indicative of any particular control scheme or duty cycle control loop bandwidth). At least initially, $L_{OUT}$ will continue to shift its stored energy to $C_L$, causing $V_{OUT}$ to continue to rise as $C_L$ is charged. Eventually, $I_{OUT}$ is reduced below $I_B$ such that charge begins to be removed from $C_L$ to power $R_L$, and $V_{OUT}$ begins to drop back toward its nominal value $V_{NOM}$. In the meantime, $V_{OUT}$ has risen above the maximum specified load voltage $V_{MAX}$, and may have resulted in damage to a component connected to the node $V_{OUT}$.

As the voltage $V_{OUT}$ is reduced by supplying load current from $C_L$, $V_{OUT}$ may also significantly undershoot $V_{NOM}$ as $I_{OUT}$ has been reduced below $I_B$ in order to compensate for the initial voltage overshoot, and time is required to reestablish the proper value of $I_{OUT}$.

In FIG. 5, initial conditions are similar to those shown in FIG. 4 up through time $T_1$, when the load current is stepped from $I_A$ to $I_B$. As $V_{OUT}$ rises above some threshold voltage, however, control circuit 220 decides that it cannot effectively control $V_{OUT}$ just by adjusting the duty cycle of $M_1$ and $M_2$. Therefore, during turn off of $M_1$, control circuit 220 activates $M_2$ and $M_3$ at $T_2$. The energy stored in the combined core of $L_{OUT}$ and $L_{OR}$ induces a current I2 in $L_{OR}$, thereby reducing $I_{OUT}$ during the "off" cycle of the power converter almost instantaneously. $M_3$ may be activated in conjunction with $M_2$ during multiple consecutive off portions of duty cycles, as necessary, until $V_{OUT}$ reduces to a level that can be handled using duty cycle control alone. This reduces the charging current $I_{CL}$ and allows $V_{OUT}$ to stabilize and reverse before reaching $V_{MAX}$, thus providing improved voltage regulation when the load steps from a higher or maximum load to a lower, minimum, or no load.

Figure 6:
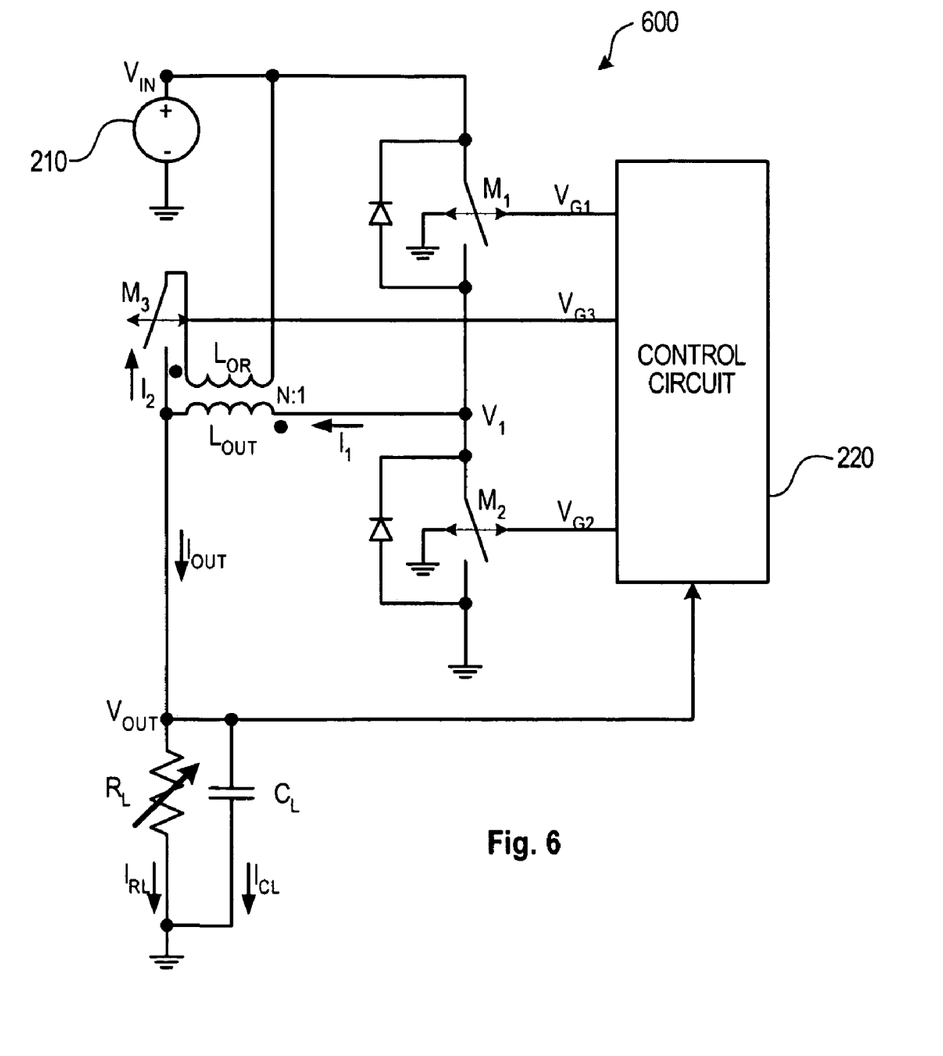
FIGS. 6-9 illustrate alternate embodiments of a power converter.

Other alternate arrangements are possible. For instance, in FIG. 6 a power converter 600 is similar to power converter 300 of FIG. 3. Switch $M_3$, however, is placed between the output node $V_{OUT}$ and one terminal of $L_{OR}$, and the other terminal of $L_{OR}$ is connected to power supply node $V_{IN}$. In either the FIG. 3 or FIG. 6 configuration, the connection to the power converter output node is optional—this node could alternately be connected to ground, with appropriate adjustments in the turns ratio (e.g., to a value $V_{IN}/V_{OUT}$).

Figure 7:
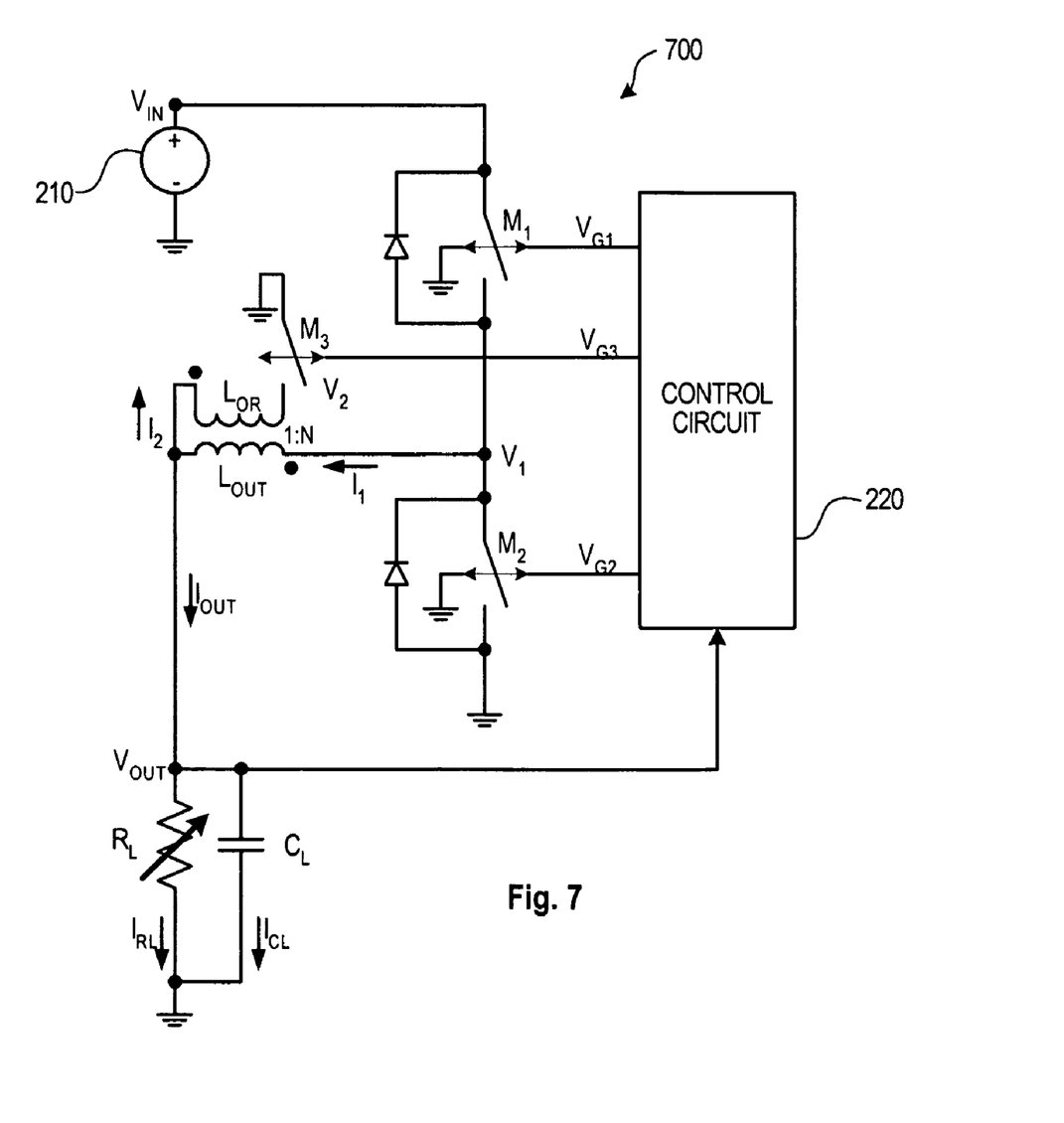

FIG. 7 shows another power converter arrangement 700, similar to power converter 300. Instead of recovering excess energy from $L_{OUT}$ back to the power supply, however, power converter 700 dissipates the excess energy to ground. Note that in this case, $M_3$ can be activated in conjunction with $M_1$ instead of $M_2$, with a turns ratio of 1:N instead of N:1. Alternately, the turns ratio can be set to 1:1 and $M_3$ can be activated in conjunction with $M_2$.

Figure 8:
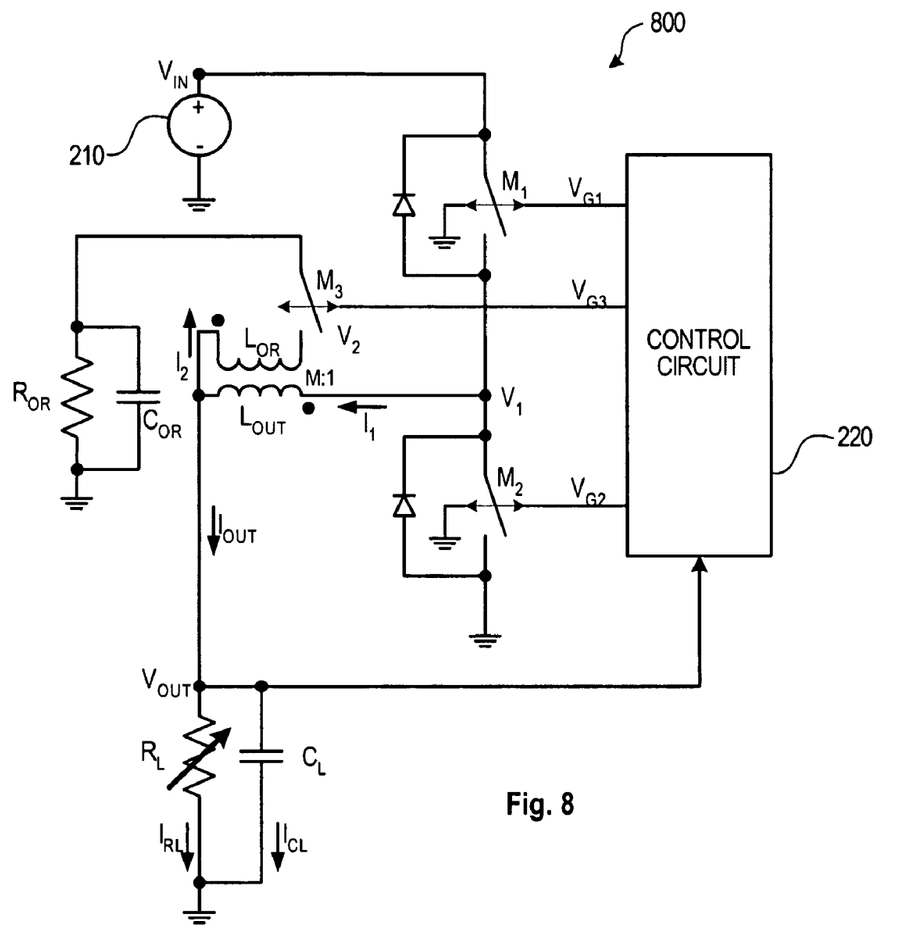

FIG. 8 shows another power converter arrangement 800, similar to power converter 300. Instead of recovering excess energy from $L_{OUT}$ back to the power supply, however, power converter 800 transfers the energy to an output regulation circuit comprising a resistor $R_{OR}$ in parallel with a capacitor $C_{OR}$. The output regulation circuit can be another load in the information handling system, e.g., one with capacitance $C_{OR}$ better suited than $C_L$ to handling the excess energy from $L_{OUT}$. The output regulation circuit could be a load that dissipates the energy through the resistor attached or could later be switched into the $V_{in}$ circuit.

Figure 9:
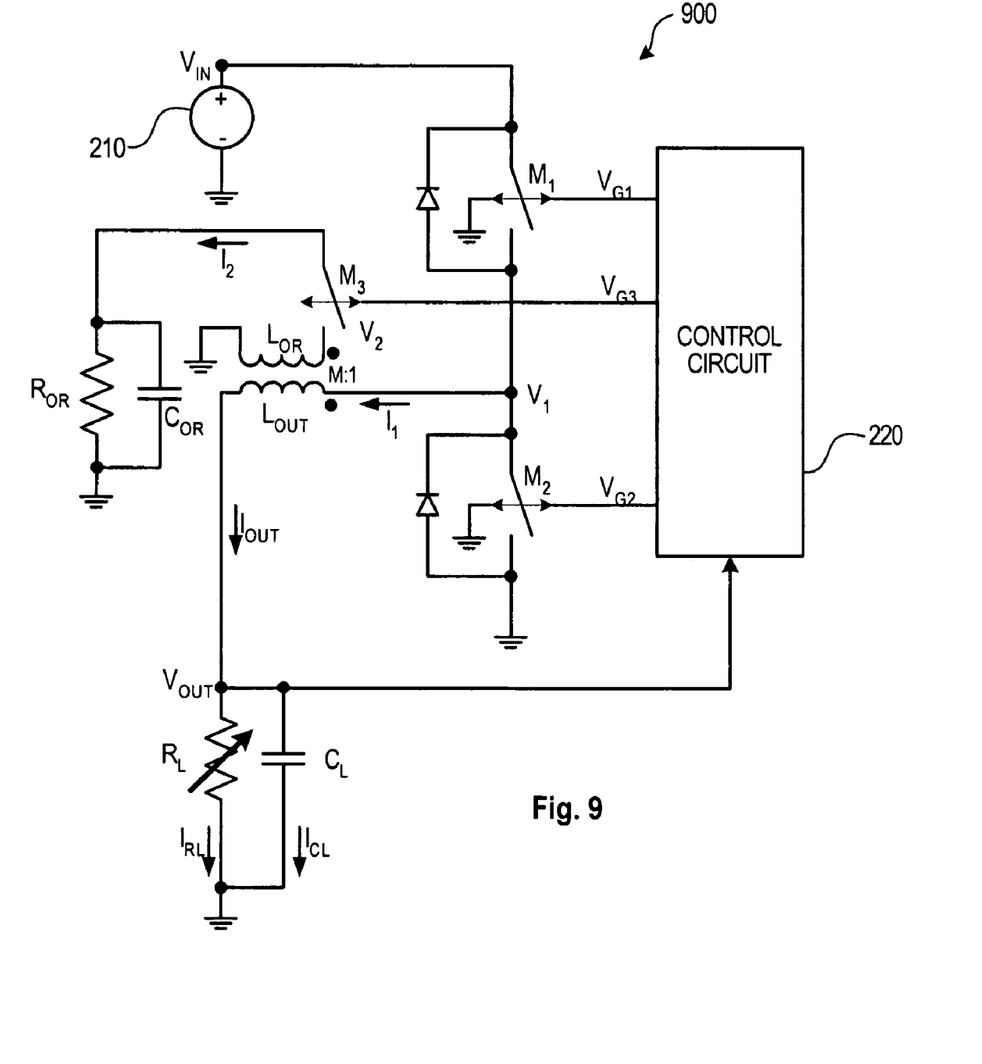

FIG. 9 shows another power converter arrangement 900, similar to power converter 800. FIG. 9 illustrates that the output regulation circuit can be only inductively coupled to $L_{OUT}$, thus providing improved isolation between the two loads.

Those skilled in the art will recognize that a variety of circuit designs are available to implement a power converter using the teachings described herein. For instance, although a buck converter design is shown, similar principles can be applied to a boost power converter or buck/boost power converter.

Although illustrative embodiments have been shown and described, a wide range of other modification, change and substitution is contemplated in the foregoing disclosure. Also, in some instances, some features of the embodiments may be employed without a corresponding use of other features. Accordingly, it is appropriate that the appended claims be constructed broadly and in manner consistent with the scope of the embodiments disclosed herein.

What is claimed is:

1. An information handling system comprising:
   an electrical load;
   a power supply;
   a switched inductor power converter to distribute power at an output voltage and output current to the electrical load, the power converter including a first switched inductor, wherein the first switched inductor is an output inductor coupled to the electrical load;
   a coupled inductor regulator including a second switched inductor, inductively coupled to the first switched inductor, wherein the second switched inductor couples with a switch to provide a path for energy stored in the first switched inductor to be reduced substantially instantaneously, wherein the switch provides the path for energy only when energy stored in the first switched inductor is to be reduced substantially instantaneously;
   a control circuit to activate the coupled inductor regulator in response to a change in the power requirements of the electrical load; and
   wherein the coupled inductor regulator when activated diverting at least a portion of the output current from the first switched inductor through the path of the switch to the power supply.

2. The information handling system of claim 1, wherein the power supply supplies power at an input voltage to the switched inductor power converter for conversion to power at the output voltage.

3. The information handling system of claim 2, wherein the turns ratio of the first inductor to the second inductor is related to the ratio of the nominal value of the output voltage to the nominal value of the input voltage.

4. The information handling system of claim 2, wherein the power converter is a buck converter.

5. The information handling system of claim 1, further comprising: the switched inductor power converter having a variable duty cycle having an on period and an off period, wherein the control circuit synchronizes the activation of the coupled inductor regulator with one of the on period and the off period of the power converter duty cycle.

6. A method of supplying power to an information handling system, the method comprising:
   supplying power to one or more components of the information handling system through a switched inductor power converter having a first switched inductor, wherein the first switched inductor is an output inductor coupled to the electrical load;
   sensing a reduction in electrical load conditions placed on the switched inductor power converter;
   in response to the sensed reduction, activating a second switched inductor, inductively coupled to the first switched inductor, to remove a portion of the energy stored in the first switched inductor, wherein the second switched inductor couples with a switch to provide a path for energy stored in the first switched inductor to be reduced substantially instantaneously, wherein the switch provides the path for energy only when energy stored in the first switched inductor is to be reduced substantially instantaneously; and
   the second switched inductor returning the enemy removed from the first switched inductor through the path of the switch to a power supply.

7. The method of claim 6, wherein sensing a reduction in electrical load conditions comprises monitoring an output voltage of the power converter for increases in the output voltage.

8. The method of claim 5, wherein supplying power through a switched inductor power converter comprises operating the power converter according to a variable duty cycle having an on period and an off period, and wherein activating the second switched inductor comprises synchronizing the activation of the second switched inductor with on of the on period and the off period of the power converter duty cycle.

9. The method of claim 8, further comprising: the power supply supplying power at an input voltage to the power converter for conversion to power supplied to the one or more components.

10. The method of claim 8, further comprising: the second switched inductor directing the energy removed from the first switched inductor to ground.

11. The method of claim 8, further comprising: the second switched inductor directing the energy removed from the first switched inductor to an output regulation load.

\* \* \* \* \*

UNITED STATES PATENT AND TRADEMARK OFFICE
CERTIFICATE OF CORRECTION

PATENT NO. : 7,602,163 B2 Page 1 of 1
APPLICATION NO. : 11/313343
DATED : October 13, 2009
INVENTOR(S) : Johnson et al.

It is certified that error appears in the above-identified patent and that said Letters Patent is hereby corrected as shown below:

Claim 6, Column 6, Line 36, delete "enemy" and insert --energy--.

Signed and Sealed this

Fifth Day of January, 2010

David J. Kappos
*Director of the United States Patent and Trademark Office*